United States Patent
Ku et al.

(10) Patent No.: US 10,404,864 B2
(45) Date of Patent: Sep. 3, 2019

(54) METHOD AND APPARATUS FOR INTER-CARRIER COMMUNICATIONS

(71) Applicant: AT&T INTELLECTUAL PROPERTY I, LP, Atlanta, GA (US)

(72) Inventors: Bernard Ku, Austin, TX (US); Lakshminarashimhan Naidu, Pearland, TX (US); James W. Forsyth, Royal Oak, MI (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 217 days.

(21) Appl. No.: 15/183,616

(22) Filed: Jun. 15, 2016

(65) Prior Publication Data
US 2017/0366676 A1    Dec. 21, 2017

(51) Int. Cl.
*H04M 7/00* (2006.01)
*H04L 29/12* (2006.01)
(Continued)

(52) U.S. Cl.
CPC ...... *H04M 7/0075* (2013.01); *G06F 16/2365* (2019.01); *G06F 16/273* (2019.01);
(Continued)

(58) Field of Classification Search
CPC .............. H04M 7/0075; H04M 7/0093; G06F 17/30345; G06F 17/30386
See application file for complete search history.

(56) References Cited

U.S. PATENT DOCUMENTS

| 7,027,582 B2 | 4/2006 | Khello et al. |
| 7,558,254 B2 | 7/2009 | Haase et al. |

(Continued)

FOREIGN PATENT DOCUMENTS

WO    2008031927 A1    3/2008

OTHER PUBLICATIONS

Tu, et al., "Control-Plane Protocol Interactions in Cellular Networks", SIGCOMM, 2014.
(Continued)

*Primary Examiner* — Tejis Daya
(74) *Attorney, Agent, or Firm* — Guntin & Gust, PLC; Douglas Schnabel

(57) ABSTRACT

Aspects of the subject disclosure may include, for example, receiving, from a private telephone number mapping server, a first database comprising address records associated with subscriber devices of a first carrier, storing, at an inter-carrier server system, an inter-carrier mapping database comprising the address records converted to an inter-carrier format, receiving new address records associated with new subscriber devices registered with the first carrier, updating the inter-carrier mapping database with the address records converted to the inter-carrier format, receiving a first query for an address record associated with a called number of a first device of the first carrier for initiating an internet protocol call between the first device and a second device of the second carrier, querying the inter-carrier mapping database of the inter-carrier server system for the address record, and transmitting the address record to the second carrier for routing the internet protocol call. Other embodiments are disclosed.

20 Claims, 11 Drawing Sheets

(51) Int. Cl.
*G06F 16/27* (2019.01)
*G06F 16/23* (2019.01)

(52) U.S. Cl.
CPC .......... *H04L 61/106* (2013.01); *H04L 61/157* (2013.01); *H04L 61/1511* (2013.01); *H04L 61/605* (2013.01); *H04M 7/0093* (2013.01)

(56) References Cited

U.S. PATENT DOCUMENTS

| | | | |
|---|---|---|---|
| 7,920,549 | B2 | 4/2011 | Alt et al. |
| 8,184,798 | B2 | 5/2012 | Wiatrowski |
| 8,249,056 | B2 | 8/2012 | Ku |
| 8,391,273 | B2 | 3/2013 | Ku et al. |
| 8,411,670 | B2 | 4/2013 | Ganesan et al. |
| 8,458,342 | B2 | 6/2013 | Ku |
| 8,537,993 | B2 | 9/2013 | Dwight et al. |
| 8,571,015 | B2 | 10/2013 | Ku |
| 8,681,774 | B2 | 3/2014 | Ku et al. |
| 8,831,201 | B2 | 9/2014 | Ku et al. |
| 9,154,526 | B2 * | 10/2015 | Jackson .............. H04L 65/1016 |
| 9,191,264 | B2 | 11/2015 | Ku et al. |
| 9,258,268 | B2 | 2/2016 | Yasrebi et al. |
| 2004/0214554 | A1 * | 10/2004 | Binning .......... H04M 1/274516 455/414.1 |
| 2005/0182781 | A1 | 8/2005 | Bouvet et al. |
| 2007/0121908 | A1 * | 5/2007 | Benedyk .......... H04L 29/12122 379/350 |
| 2008/0263389 | A1 | 10/2008 | Ku et al. |
| 2008/0285543 | A1 | 11/2008 | Qiu |
| 2009/0010250 | A1 * | 1/2009 | Ganesan ........... H04L 29/12066 370/352 |
| 2009/0022149 | A1 * | 1/2009 | Rosenberg .......... H04M 7/0057 370/389 |
| 2009/0161854 | A1 * | 6/2009 | Ku ..................... H04M 3/42017 379/207.16 |
| 2009/0225744 | A1 * | 9/2009 | Zerillo ................ H04L 29/1216 370/352 |
| 2010/0150132 | A1 * | 6/2010 | Ku .................... H04L 29/12132 370/351 |
| 2010/0157977 | A1 * | 6/2010 | Ku ...................... H04L 29/1216 370/352 |
| 2010/0158229 | A1 * | 6/2010 | Ku ...................... H04L 29/1216 379/201.01 |
| 2014/0071979 | A1 * | 3/2014 | Forsyth ............... H04M 7/0075 370/352 |
| 2015/0131526 | A1 | 5/2015 | Noldus et al. |
| 2016/0021336 | A1 | 1/2016 | Abbott et al. |
| 2016/0088463 | A1 | 3/2016 | Stanke et al. |
| 2017/0006164 | A1 * | 1/2017 | Ku ..................... H04M 7/0075 |

OTHER PUBLICATIONS

Tu, Guan-Hua et al., "Detecting Problematic Control-Plane Protocol Interactions in Mobile Networks", IEEE/ACM Transactions on Networking, 2015.

Werbach, Kevin , "No dialtone: The end of the public switched telephone network", Fed. Comm. LJ 66, 2013.

* cited by examiner

300

500

600

700

METHOD AND APPARATUS FOR INTER-CARRIER COMMUNICATIONS

FIELD OF THE DISCLOSURE

The subject disclosure relates to a method and apparatus for inter-carrier communications.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
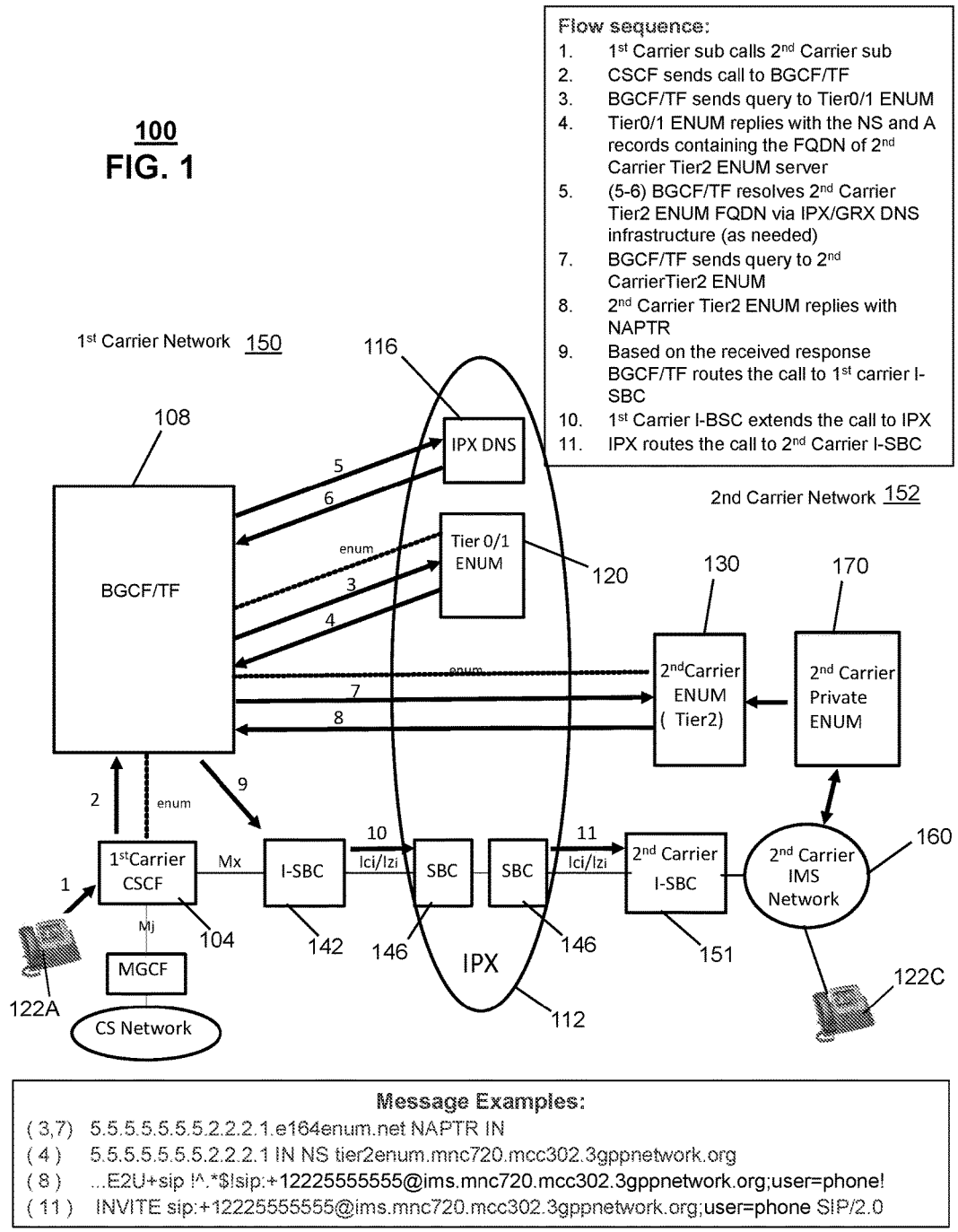
FIGS. 1-2 depict illustrative embodiments of systems for enabling full Voice-over-LTE (VoLTE) carrier-to-carrier calling.

The subject disclosure describes, among other things, illustrative embodiments for enabling inter-carrier communications between telecommunication systems. In particular, systems and methods are described for providing carrier routing for enabling subscribers of a first carrier to locate and connect with subscribers of another IP peering carrier for purposes of conducting full IP call sessions, such as voice-over-IP (VoIP). An outbound IP call from a first user device of a first carrier communication network may be destined for a second user device that is associated with a second carrier communication network. As a result of the call request, the first carrier may query a private tElephone Number Mapping (ENUM) of the first carrier, using a domain of the first carrier, in an attempt to obtain an address record corresponding to the called number of the second user device that is associated with the second carrier. However, the private ENUM of the first carrier may not return a matching address record with an IP address for the second user device of the second communication network. In such a case, the call request may be modified to use an inter-carrier ENUM apex domain.

The modified ENUM query may be sent to an internetwork packet exchange (IPX) Tier 1 ENUM of an IPX partner (IPX-P) network to obtain a pointer to a public Tier 2 ENUM of the second carrier communications network. The public Tier 2 ENUM can include name authority pointers (NAPTR) for all of the subscriber devices of the second carrier communication network. Further, the public Tier 2 ENUM can include a copy of all of the NAPTR pointers that are included in a private ENUM of the second user device, but with the formats of the NAPTR pointers modified to the inter-carrier ENUM apex domain. The Tier 2 ENUM of the second carrier may find an entry corresponding to the called number associated with the second user device and may return a name authority pointer (NAPTR) record associated with the entry to the second carrier, which may then be used by the first communication system to complete the outbound IP call between the first user device and the second user device. Other embodiments are described in the subject disclosure.

One or more aspects of the subject disclosure include a device, including a processing system including a processor and a memory that stores executable instructions that, when executed by the processing system, facilitate performance of operations, including receiving, from a private telephone number mapping server, a first database comprising a plurality of address records associated with a plurality of subscriber devices of a first carrier, and, in turn, storing an inter-carrier mapping database based on the plurality of address records of the first database at an inter-carrier server system. The operations can also include requesting, responsive to an update event, a plurality of new address records associated with a plurality of new subscriber devices that have been registered with the first carrier since a prior update. The operations can further include receiving the plurality of new address records that are requested, and, in turn, updating the inter-carrier mapping database at the inter-carrier server system with the plurality of address records. The operations can include receiving, from an internet protocol multimedia subsystem of a second carrier, a first query for an address record associated with a called number of a first device of the first carrier for initiating an internet protocol call between the first device and a second device of the second carrier. The operations can also include determining, according to load balance information, a first inter-carrier server of a plurality of inter carrier servers of the inter-carrier server system for servicing the first query, and, in turn, querying the inter-carrier mapping database of the inter-carrier server system for the address record associated with the called number. The operations can further include transmitting the address record of the called number to the internet protocol multimedia subsystem of the second carrier, responsive to the address record being found in the inter-carrier mapping database, for routing the internet protocol call between the second device of the second carrier and the first device of the first carrier.

One or more aspects of the subject disclosure include a machine-readable storage medium, including executable instructions that, when executed by a processing system including a processor, facilitate performance of operations, including receiving, from a private telephone number mapping server, a first database comprising a plurality of address records associated with a plurality of subscriber devices of a first carrier. The operations can include converting the plurality of address records of the first database from an intra-carrier format to an inter-carrier format to generate an inter-carrier mapping database, and, in turn, storing the inter-carrier mapping database at an inter-carrier server system. The operations can also include detecting an update event associated with the first database, wherein the update event comprises an expiration of a timer. The operations can further include requesting, responsive to the detecting of the update event, a plurality of new address records associated with a plurality of new subscriber devices that have been registered with the first carrier since a prior update. The operations can include receiving the plurality of new address records that are requested, and, in turn, updating the inter-carrier mapping database at the inter-carrier server system with the plurality of address records that have been converted to the inter-carrier format. The operations can also include receiving, from an internet protocol multimedia subsystem of a second carrier, a first query for an address record associated with a called number of a first device of the first carrier for initiating an internet protocol call between the first device and a second device of the second carrier. The address record for the called number can be unavailable at a telephone number mapping equipment of the second carrier. The operations can further include querying the inter-carrier mapping database of the inter-carrier server system for the address record associated with the called number, and, in turn, transmitting the address record to the internet protocol multimedia subsystem of the second carrier, responsive to the address record being found in the inter-carrier mapping database, for routing the internet protocol call between the second device of the second carrier and the first device of the first carrier.

One or more aspects of the subject disclosure include method, including receiving, by a processing system including a processor, from a private telephone number mapping server, a first database comprising a plurality of address records associated with a plurality of subscriber devices of a first carrier. The method can also include storing, by the processing system and at an inter-carrier server system, an inter-carrier mapping database comprising the plurality of address records converted to an inter-carrier format. The method can further include receiving, by the processing system, a plurality of new address records associated with a plurality of new subscriber devices that have been registered with the first carrier since a prior update, and, in turn, updating, by the processing system, the inter-carrier mapping database at the inter-carrier server system with the plurality of address records converted to the inter-carrier format. The method can include receiving, by the processing system and from an internet protocol multimedia subsystem of a second carrier, a first query for an address record associated with a called number of a first device of the first carrier for initiating an internet protocol call between the first device and a second device of the second carrier. The method can also include querying, by the processing system, the inter-carrier mapping database of the inter-carrier server system for the address record associated with the called number, and, in turn, transmitting, by the processing system, the address record to the internet protocol multimedia subsystem (IMS) of the second carrier for use by the internet protocol multimedia subsystem of a second carrier in routing the internet protocol call between the second device of the second carrier and the first device of the first carrier.

Figure 2:
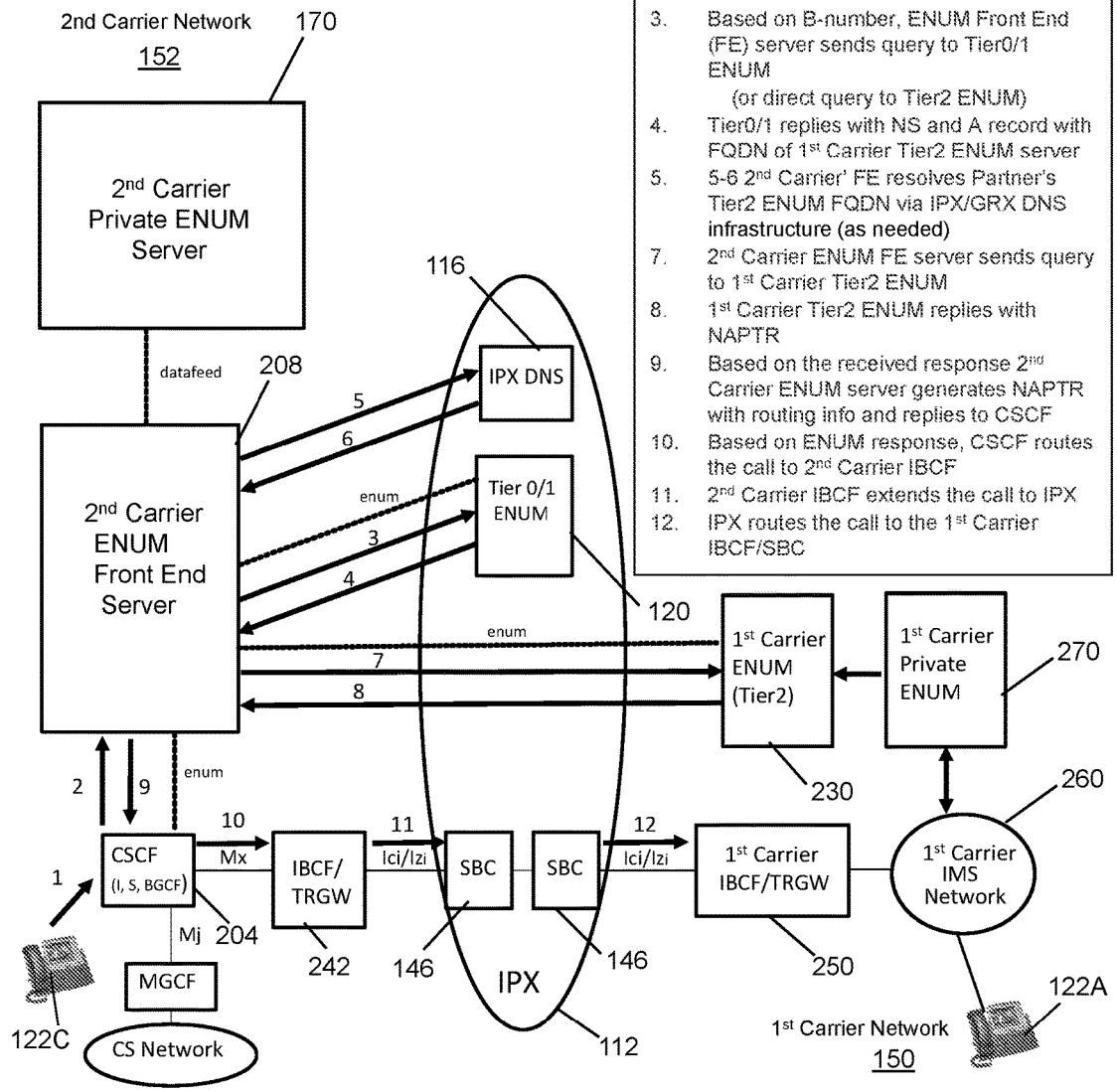

FIGS. 1-2 depict illustrative embodiments of systems for enabling full Voice-over-LTE (VoLTE) carrier-to-carrier calling. In particular, FIG. 1 depicts a schematic diagram of a system 100 for enabling IP carrier-to-carrier communications. In one or more embodiments, system 100 may be configured to support content delivery services, cloud computing services, IP Multimedia Subsystem (IMS) services, satellite services, telephone services, voice-over-internet protocol services (VoIP), voice-over-long-term-evolution (VoLTE) services, software as a service (SaaS) applications, gaming applications and services, productivity applications and services, mobile applications and services, and any other computing applications and services. The system 100 may include a first device 122A that may be utilized to access data, content, and services, or to perform a variety of other tasks and functions for a subscriber of the first carrier network 150. As an example, the first device 122A may be used to make one or more IP-based calls (or other types of calls) to devices of other subscribers of the first carrier network 150, to devices 122C of subscribers of a second carrier network 152, or to devices of subscribers of any other carrier. In one or more embodiments, the first device 122A may be a computer, a laptop, a tablet device, a phablet, a server, a mobile device, a smartphone, a smart watch, or any other type of computing device.

In one or more embodiments, the system 100 may also include a second device 122C that may be used by a subscriber to the second carrier network 152 to also access data, content, and services, and to perform a variety of other functions. For example, the second device 122C may also be used to transmit signals to request various types of content, services, and data provided by content and service providers associated with the second carrier network 152 or any other network in the system 100. Also, the second device 122C may be used to make one or more IP-based calls (or other types of calls) to devices of other subscribers of the second carrier network 152, devices of subscribers of the first carrier network 150, or devices of subscribers of any other carrier. Similar to the first device 122A, in one or more embodiments, the second device 122C may be a computer, a laptop, a tablet device, a phablet, a server, a mobile device, a smartphone, a smart watch, or any other type of computing device.

In one or more embodiments, the system 100 may also include a first carrier communications network 150 that may be configured to link each of the devices in the system 100 to one another. For example, the first carrier communications network 150 may be utilized by the first device 122C to connect with other devices within or outside first carrier communications network 150. Additionally, the first carrier communications network 150 may be configured to transmit, generate, and receive any information and data traversing the system 100. In one or more embodiments, the first carrier communications network 150 may include any number of servers, databases, or other componentry. The first carrier communications network 150 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a multiprotocol label switching (MPLS) network, a content distribution network, any network, or any combination thereof. In one or more embodiments, the first carrier communications network 150 may be part of a single autonomous system that is located in a particular geographic region, or be part of multiple autonomous systems that span several geographic regions.

The first carrier communications network 150 may include a series of components to facilitate communications and the functions of the first carrier communications network 150. In particular, the first carrier communications network 150 may include a first carrier call session control function (CSCF) 104, to which control signals from a first device 122A may be routed when making an IP-based call. In one or more embodiments, the first carrier communications network 150 may include an interconnect-SBC (I-SBC) 142 that may reside at a boundary of the first carrier communications network 150, where different networks may interconnect or peer with the first carrier communications network 150. For example, the I-SBC may provide an interconnect routing to an IPX-P network 112 and/or the second carrier communications network 152. The first carrier communications network 150 may also include a first carrier private ENUM that may conform to an Internet Engineering Task Force (IETF) ENUM standard. The private ENUM may also include any of the functions and features of a traditional private ENUM and may be private to the first carrier communications network 150.

In one or more embodiments, a private ENUM can include NAPTR records and DNS records and can use NAPTR records and DNS records for translating telephone numbers into URI addresses and/or IP addresses that can be further used to query an IPX Tier 0/1 ENUM 120 and/or an IPX DNS 116. In one embodiment, if the private ENUM does not return a NAPTR record for the second device 122C to the $1^{st}$ Carrier CSCF 104, then the $1^{st}$ Carrier CSCF 104 can forward the query to a Breakout Gateway Control Function/Transit Function (BGCF/TF) 108. The BGCF/TF 108 can then query the Tier 0/1 ENUM 120 at the IPX-P network 112.

In one or more embodiments, the BGCF/TF 108 can perform a series of actions to procure the NAPTR record for the second device 122C from the IPX-P network 112 and/or the second carrier network 152 and thus relieve the administrative and communication burden of procuring the NAPTR record for a second carrier network device from the $1^{st}$ Carrier Network 150. In one embodiment, the BGCF/TF 108 can query the IPX Tier 0/1 ENUM 120, using the telephone number of the second device coupled with an inter-carrier ENUM apex domain. The IPX Tier 0/1 ENUM 120 can return a pointer to a second carrier Tier 2 ENUM 130. If the pointer includes a URI for the second carrier Tier 2 ENUM 130, but not an IP address, then the BGCF/TF 108 can resolve the URI into the IP address by querying a DNS server, such as an IPX DNS 116. In one embodiment, once the BGCF/TF 108 has the IP address of the second carrier Tier 2 ENUM 130, the BGCF/TF 108 can query the second carrier Tier 2 ENUM 130 for the NAPTR record of the second device 122C. The BGCF/TF 108 can then return the NAPRT record to the BGCF/TF 108, which can then route the IP call through the I-SBC 142 of the first carrier, the SBCs 146 of the IPX-P network 112, the I-SBC 151 of the second carrier, and the second carrier IMS network 152 to complete a connection between the first device 122A and the second device 122C and provide a full-IP capability.

In one or more embodiments, the system 100 may further include an IPX-P network 112. The IPX-P network 112 of the system 100 may be configured to link each of the devices and/or networks in the system 100 to one another. The IPX-P network 112 may be a partner network of the first carrier communications network 150 and/or a partner network of the second carrier communications network 152. Additionally, the IPX-P network 112 may be configured to transmit, generate, and receive any information and data traversing the system 100. In one or more embodiments, the IPX-P network 112 may include any number of servers, databases, or other componentry. The IPX-P network 112 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network or any combination thereof. In one or more embodiments, the IPX-P network 112 may be part of a single autonomous system that is located in a particular geographic region, or be part of multiple autonomous systems that span several geographic regions.

In one or more embodiments, the IPX-P network 112 may include a series of SBCs 146 that may be utilized to exert control over signaling associated with communications, such as calls, traversing through the IPX-P network 112, and may include any functionality associated with a session border controller. The IPX-P network 112 may further include an IPX Tier 0/1 ENUM 120. The IPX Tier 0/1 ENUM 120 may be a higher tiered ENUM as compared to other ENUMs in the system 100. The IPX Tier 0/1 ENUM 120 may store name server records including information and IP addresses for Tier 2 ENUMs 130 of networks that are partnered with the IPX-P network 112. For example, the IPX Tier 0/1 ENUM 120 may include IP address information and pointers to the Tier 2 ENUM 130/230 of the second carrier network 152 or of the first carrier network 150. In one or more embodiments, the IPX Tier 0/1 ENUM 120 may store name server records and pointers for other types of ENUMs and/or for any type of devices in other partner networks.

In one or more embodiments, the IPX-P network 112 can further include an IPX domain name server (IPX DNS) 116. The IPX DNS 116 can include DNS records for use in converting URI addresses into IP addresses. In one embodiment, the BGCF/TF 108 can query the IPX DNS 116 of the IPX-P network 112, using a URI address that it has obtained for the second carrier Tier 2 ENUM 130. The IPX DNS 116 can resolve the URI address to the correct IP address so that the BGCF/TF 108 can query the second carrier Tier 2 ENUM 130.

In one or more embodiments, the system 100 may also include a second carrier communications network 152. The second carrier communications network 152 of the system 100 may be configured to link each of the devices in the system 100 to one another. For example, the second carrier communications network 152 may be utilized by the second user device 122C to connect with other devices within or outside second carrier communications network 152. Additionally, the second carrier communications network 152 may be configured to transmit, generate, and receive any information and data traversing the system 100. In one or more embodiments, the second carrier communications network 152 may include any number of servers, databases, or other componentry. The second carrier communications network 152 may also include and be connected to a cloud-computing network, an IMS network, a VoIP network, a VoLTE network, a wireless network, an Ethernet network, a satellite network, a broadband network, a cellular network, a private network, a cable network, the Internet, an internet protocol network, a MPLS network, a content distribution network, any network, or any combination thereof. In o embodiments, the second carrier communications network 152 may be part of a single autonomous system that is located in a particular geographic region, or be part of multiple autonomous systems that span several geographic regions.

In one or more embodiments, the second carrier communications network 152 may include a series of components to facilitate communications and the functions of the second carrier communications network 152. In particular, the second carrier communications network 152 may include I-SBCs 151, which may include any of the functions of a traditional session border controller. For example, a second carrier I-SBC 151 may reside at a border of the second carrier communications network 152 and may exert control over signaling associated with communications, such as calls, traversing through the second carrier communications network 152. The second carrier communications network 152 may also include a second carrier Tier 2 ENUM 130 that may include any of the functionality of a traditional Tier 2 ENUM. Tier 2 ENUM 234 may utilize DNS records to translate telephone numbers into a URI or IP address that may be utilized in IP-based communications.

In one or more embodiments, the second communication network 150 can include a private ENUM server 170. The second carrier private ENUM 170 can include NAPTR records and DNS records and can use NAPTR records and DNS records for translating telephone numbers into URI addresses and/or IP addresses that can be further used to query an IPX Tier 0/1 ENUM 120 and/or an IPX DNS 116. In one embodiment, if the second carrier private ENUM 170 can include NAPTR records for devices subscribed to the second communication network 152 but not those of the first communication network 150 or other networks. In one or more embodiments, the second carrier private ENUM 170 can store NAPTR records, which can be copied to the second carrier Tier 2 ENUM 130.

In one or more embodiments, and particularly referring to FIG. 2, a schematic diagram of a system 200 is depicted. In this embodiment, the second device 122C of the second carrier network 152 initiates an IP call (VoLTE) to the first device 122A of the first carrier network 150. In one or more embodiments, the second communication network 152 can include second carrier private ENUM 170, which can include NAPTR records and DNS records and can use NAPTR records and DNS records for translating telephone numbers into URI addresses and/or IP addresses for the second carrier's network. In one embodiment, the second carrier ENUM Client 208 can serve as a front end server for the second communication network 152 to connect a second device 122C to a first device 122A.

In one or embodiments, if the second carrier private ENUM 170 does not have the NAPTR record for the first device 122A, then second carrier ENUM client 208 can perform a series of actions to procure the NAPTR record for the first device 122A from the IPX-P network 154 and/or the first carrier network 150 and thus relieve the administrative and communication burden of procuring the NAPTR record for a first carrier network device 122A from the Second Carrier Network 152. In one embodiment, the second carrier ENUM client 208 can query the IPX Tier 0/1 ENUM 120, using the telephone number of the first device 122A coupled with an inter-carrier ENUM apex domain. The IPX Tier 0/1 ENUM 120 can return a pointer to a first carrier Tier 2 ENUM 230. If the pointer includes a URI for the first carrier Tier 2 ENUM 230, but not an IP address, then the second carrier ENUM client 208 can resolve the URI into the IP address by querying a DNS server, such as an IPX DNS 116. In one embodiment, once the second carrier ENUM client 208 has the IP address of the first carrier Tier 2 ENUM 230, then the second carrier ENUM client 208 can query the first carrier Tier 2 ENUM 230 for the NAPTR record of the first device 122A. The second carrier ENUM client 208 can then return the NAPRT record to the second carrier CSCF 204, which can then route the IP call through the IBCF/TRGW 242 of the first carrier, the SBCs 146 of the IPX-P network 112, the IFCF/TRGW 250 of the first carrier, and the first carrier IMS network 260 to complete a connection between the first device 122A and the second device 122C and provide a full-IP capability.

Figure 3:
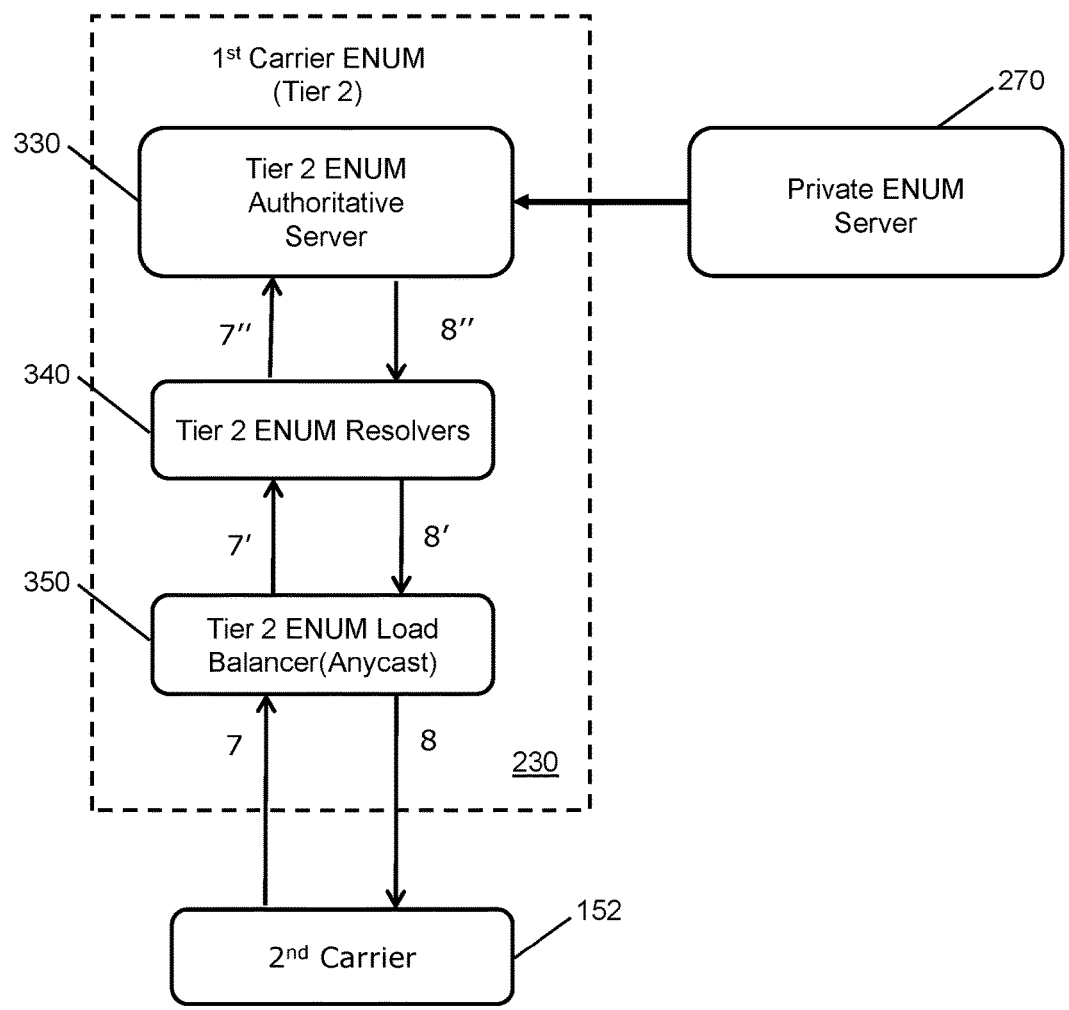
FIGS. 3-4 depict illustrative embodiments of a topology of the telecommunications system for enabling full VoLTE carrier-to-carrier calling as described in the systems of FIGS. 1-2.
Figure 4:
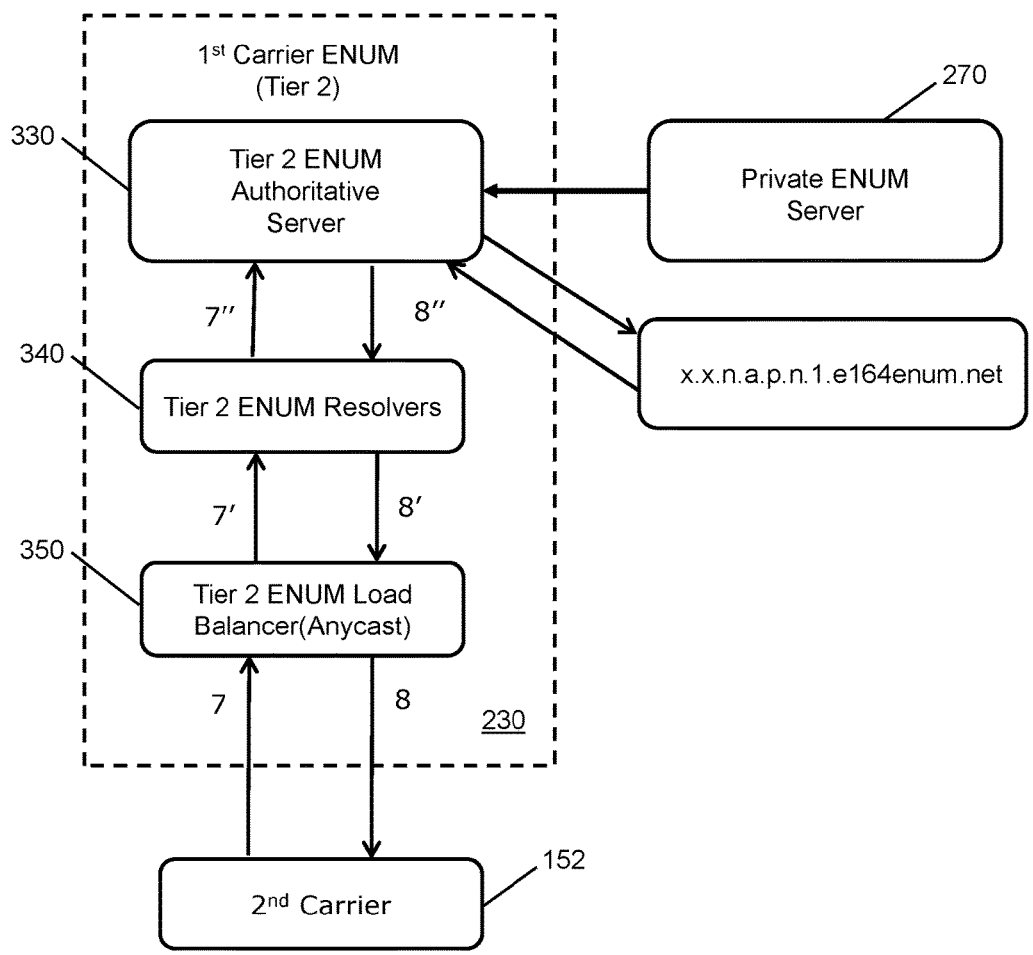

FIGS. 3-4 depict illustrative embodiments of a topology of the telecommunications system for enabling full VoLTE carrier-to-carrier calling as described in the systems of FIGS. 1-2. In one or more embodiments, further embodiments are shown for the first carrier, Tier 2 ENUM 230 of the first communication network 150. In particular, the Tier 2 ENUM 230 can be accessible to a second carrier network 152, so that the second carrier network 152 can query for and receiver NAPTR records associated with first devices 122A of the first carrier network 150. The first carrier, Tier 2 ENUM 230 can maintain fully up to date NAPTR records that are based on the records at the Private ENUM server 270 of the first communication network 150. However, the Tier 2 ENUM 230 can provide improvements over the Private ENUM server 270. First, the Tier 2 ENUM 230 can isolate the Private ENUM server 270 from direct access by outside communication networks 152. The Private ENUM server 270 is kept private and protected and only available for access by internal assets of the first communication network 150. Second, while the Private ENUM server 270 can maintain the NAPTR records in an internal domain format (e.g., "e164.arpa"), which is useful intra-network communication sessions, the Tier 2 ENUM 230 can maintain the same NAPTR records in a format that is useful for inter-network communication sessions (e.g., "e164enum.net"), which is compatible with the apex (IPX) domain. The Private ENUM server 270 can support a variety of communication session protocols, including VoLTE, CVoIP, CLIMS, Trinity, and/or Cricket. The Tier 2 ENUM 230 can only support VoLTE. However the VoLTE protocol provides many advantages features to combine device-to-device session-based communications with rich digital data applications. In one or more embodiments, the Tier 2 ENUM 230 provides reasonable cost structure and scalability for providing inter-carrier VoLTE capability, while protecting the security of the Private ENUM server 270 in both IP address space and at the physical hardware cluster level.

In one or more embodiments, the Tier 2 ENUM 230 can pull private, NAPTR records from the Private ENUM server 270 to ensure data integrity and accuracy. In one embodiments, the Tier 2 ENUM 230 can pull the NAPTR records, in total, as part of an initialization of the Tier 2 ENUM 230. At that point, the Tier 2 ENUM 230 and the Private ENUM server 270 will have the same NAPTR information. As time passes, however, the NAPTR records at the Private ENUM server 270 will change. For example, current subscribers may choose to not renew their subscription or may change their telephone number or location information, which can result in changes to their NAPTR records. In another example, new subscribers may join the service, which creates new NAPTR records. In a nationwide communications system 100, every day, many thousands of subscribers may enter or leave the system or make other substantive changes that will be reflected in NAPTR record changes. As a result, the Tier 2 ENUM 230 may be configured to automatically poll the Private ENUM server 270 on a periodic basis to determine which NAPTR records have changed since the last update. The Tier 2 ENUM 230 can then pull those NAPTR records from the Private ENUM server 270 so that the Tier 2 ENUM 230 is kept up to date without risking the security of the Private ENUM server 270. For example, the Tier 2 ENUM 230 can poll the Private ENUM server 270 every thirty minutes for information on the latest changes to the NAPTR records. In another embodiment, the Private ENUM server 270 can inform the Tier 2 ENUM 230 each time the Private ENUM server 270 is updated with new NAPTR records, The Tier 2 ENUM 230 can request each new or modified NAPTR record that is reported by the Private ENUM server 270. Or, the Tier 2 ENUM 230 can wait for specific number of changes to occur, or a specific passage of time, before requesting the latest NAPTR information.

In one or more embodiments, the Tier 2 ENUM 230 can change the format of the NAPTR records for use by the outside carrier networks. For example, the Tier 2 ENUM 230 can change from the format of the Private ENUM server 270, where the NAPTR records are in the "e164.arpa" internal domain format, to the apex domain format "e164enum.net," which is useful for the outside carriers. The Tier 2 ENUM 230 can thereby form an inter-carrier mapping database for the first carrier.

In one or more embodiments, a second carrier 152 can query the Tier 2 ENUM 230 by acquiring the address of the Tier 2 ENUM 230 as described above. The query to the Tier 2 ENUM 230 can include a telephone number for a first device 122A of a subscriber of the first carrier. The Tier 2 ENUM 230 can search the inter-carrier mapping database for the NAPTR record associated with the telephone number. If the NAPTR record is found, then it is reported to the second carrier 152. The second carrier 152 can use an address from the NAPTR record to complete a VoLTE connection between the first device and the second device.

In one or more embodiments, the first carrier Tier 1 ENUM 230 can include a Tier 2 ENUM Authoritative Server 330. The Tier 2 ENUM Authoritative Server 330 can include a memory for storing the inter-carrier mapping database of the NAPTR records associated with the first carrier 150. In one embodiment, the Tier 2 ENUM Authoritative Server 330 can be implemented as multiple sub-servers, each of which contains a complete copy of the inter-carrier mapping database. The multiple sub-servers can be located in multiple locations. In one or more embodiments, the Tier ENUM 230 can also include a Tier 2 ENUM Load Balancer 350. The Tier 2 ENUM Load Balancer 350 can monitor the loading of query requests from outside carriers and the assignment to and servicing by the multiple sub-servers of the Tier 2 ENUM Authoritative Server 330. The Tier 2 ENUM Load Balancer 350 can determine how each of the sub-servers of the Tier 2 ENUM Load Balancer 350 is loaded and can compare these loading to the capabilities of each sub-server. The Tier 2 ENUM Load Balancer 350 can determine how to balance the loading between the sub-servers of the Tier 2 ENUM Authoritative Server 330 and can route queries to the sub-servers accordingly to maintain balance within the system of the Tier 2 ENUM server. 230.

In one or more embodiments, the Tier 2 ENUM server 230 can include one or more Tier 2 ENUM Resolvers 340 for directing the routing of the queries to the proper sub-servers of the Tier 2 ENUM server 230. The Tier 2 ENUM Resolvers 340 can store a database of domain name system names and services that can resolve system routing locations (addresses) of queries to the sub-servers of the Tier 2 ENUM server 230.

Figure 5:
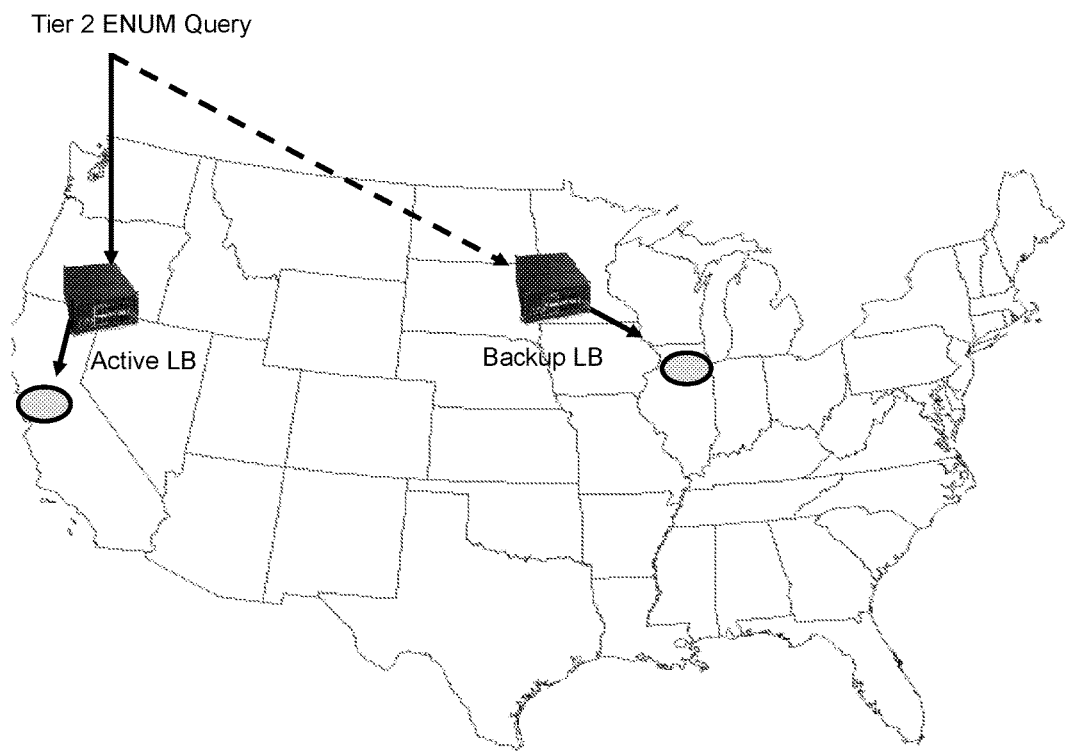
FIGS. 5-6 depict illustrative embodiments for logical telephone number mapping (ENUM) resolution for enabling full VoLTE carrier-to-carrier.
Figure 6:

FIGS. 5-6 depict illustrative embodiments for logical telephone number mapping (ENUM) resolution for enabling full VoLTE carrier-to-carrier. In one or more embodiments, the system 500 can place more the Tier 2 ENUM servers 230, along with additional sets of communication servers, in one or more geographic sites. In one embodiment, as a first Tier 2 ENUM server 230 can serve as a primary, or active, telephone mapping server, while a second Tier 2 ENUM server 230 can serve as a secondary, or backup, telephone mapping server. In one embodiment, a single "anycast" address may serve for addressing the Tier 2 ENUM server 230, while the load balancing and resolving utilities determine the actual routing of queries from the outside carrier between the active and backup telephone mapping servers. In another embodiment, each of the two Tier 2 ENUM servers 230 can serve as a backup for the other server. In this scenario, queries can be routed geographically, so, for example, a query emanating from a Western region can be typically routed to a Western region site for processing by the Tier 2 ENUM server 230 at that site. If, however, the load balancing utility detects excessive loading and/or slow throughput at the Western region site, then the query can be automatically rerouted to a Midwestern region site for processing by the Tier 2 ENUM server 230 at that site. As the system 600 grows in subscribers and/or usage of inter-carrier VoLTE services, the system can be scaled up by dividing it into more service regions, with each region serviced by its own Tier 2 ENUM server 230. For example, the an Eastern region site and a Southern Region site can be added to create four region sites, where the "anycast" addressing, load balancing, and resolving utilities allow the telephone number mapping to be seamlessly scaled.

Figure 7:
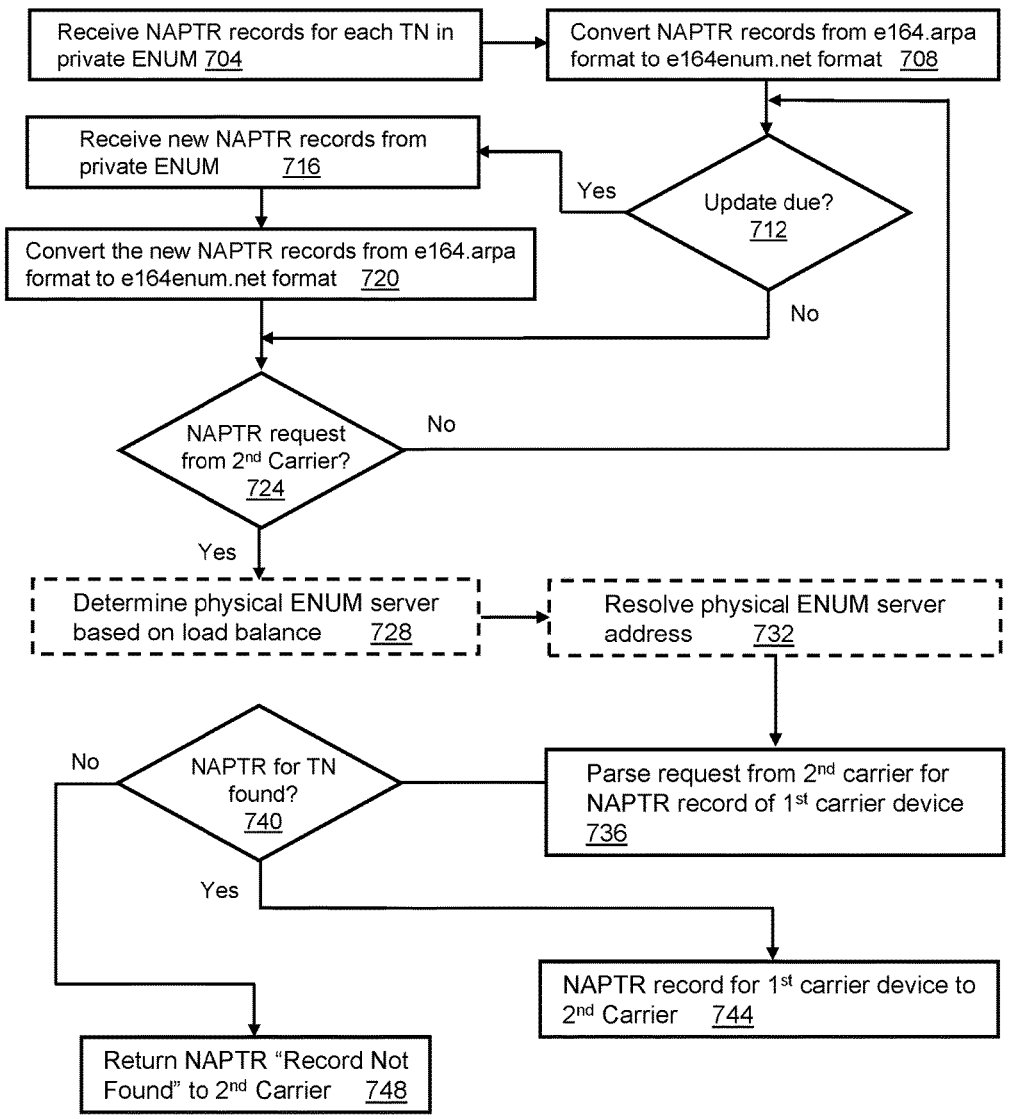
FIG. 7 depict an illustrative embodiment of a method used in portions of the system described in FIGS. 1-6.

FIG. 7 depict an illustrative embodiment of a method used in portions of the system described in FIGS. 1-6. One or more embodiments are depicted therein. In step 704, a Tier 2 ENUM server of a first carrier can receive NAPTR records for each telephone number in a private ENUM server of the first carrier. The NAPTR records can be passed to the Tier 2 ENUM server during an initial activation of the Tier 2 ENUM server. The Tier 2 ENUM server can thereby have a complete set of NAPTR records for all of the subscriber devices of the first carrier. In step 708, the Tier 2 ENUM server convert the NAPTR records from an intra-carrier format to an inter-carrier format. For example, the NAPTR records can be used by the private ENUM server in an intra-carrier format of "e164.arpa," which can be used by the first carrier for making intra-carrier, VoLTE connections between devices within the first carrier network. However, the IPX partner (IPX-P) network may require an inter-carrier format of "e164enum.net" for the various carrier networks to compatibly use the telephone number mapping facilities. The Tier 2 ENUM server can convert all of the NAPTR records from the private ENUM server to the inter-carrier format during the initial copying of the entire database to generate its own inter-carrier mapping database.

In step 712, the Tier 2 ENUM server can determine if an update to its inter-carrier mapping database is needed. Over time, new subscriber devices may join the first carrier network, while existing subscriber devices may leave the first carrier network or make substantial changes in their service plans. Any of these circumstances will result in one or more changes to the intra-carrier mapping database of the private ENUM server. In one embodiment, the Tier 2 ENUM server can determine if an update event has occurred. For example, the Tier 2 ENUM server may be configured to update on a periodic basis at the expiration of a timer. The update event can be the timer's expiration. For example, the Tier 2 ENUM server can update every 30 seconds, with a time-to-live of one minute. In another embodiment, the private ENUM server can indicate to the Tier 2 ENUM server that an update is needed. In step 716, the Tier 2 ENUM server can receive new NAPTR records from the private ENUM server, and, in turn, these new NAPTR records can be converted from the intra-carrier format to the inter-carrier format in step 720.

In step 724, the Tier 2 ENUM server can monitor for a NAPTR request/query from a second carrier network. The query can be part of an inter-carrier VoLTE call session that a second device at a second carrier network is attempting to establish with a first device at the first carrier network. If no query is received, the Tier 2 ENUM server can continue monitoring for queries and for updates to the database. If a query is received, and the Tier 2 ENUM server is configured as multiple sub-servers, then the Tier 2 ENUM server can, optionally, perform load balancing and resolving steps 728 and 732. In the load balancing step, the Tier 2 ENUM server can determine which sub-server can service the query based on relative loading of the sub-servers. In the resolving step, a resolving facility can determine a physical address for a sub-server for servicing the query.

In step 736, the Tier 2 ENUM server can parse the request/query from the second carrier for the NAPTR record of the first carrier device. In step 740, the Tier 2 ENUM server can search the inter-carrier database for the NAPTR record associated with the telephone number of the first carrier device. If the Tier 2 ENUM server finds the record, then it can return the NAPTR record for the first carrier device to the second carrier It the Tier 2 ENUM server does not find the NAPTR record, then it returns an indication of "Record Not Found" to the second carrier.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
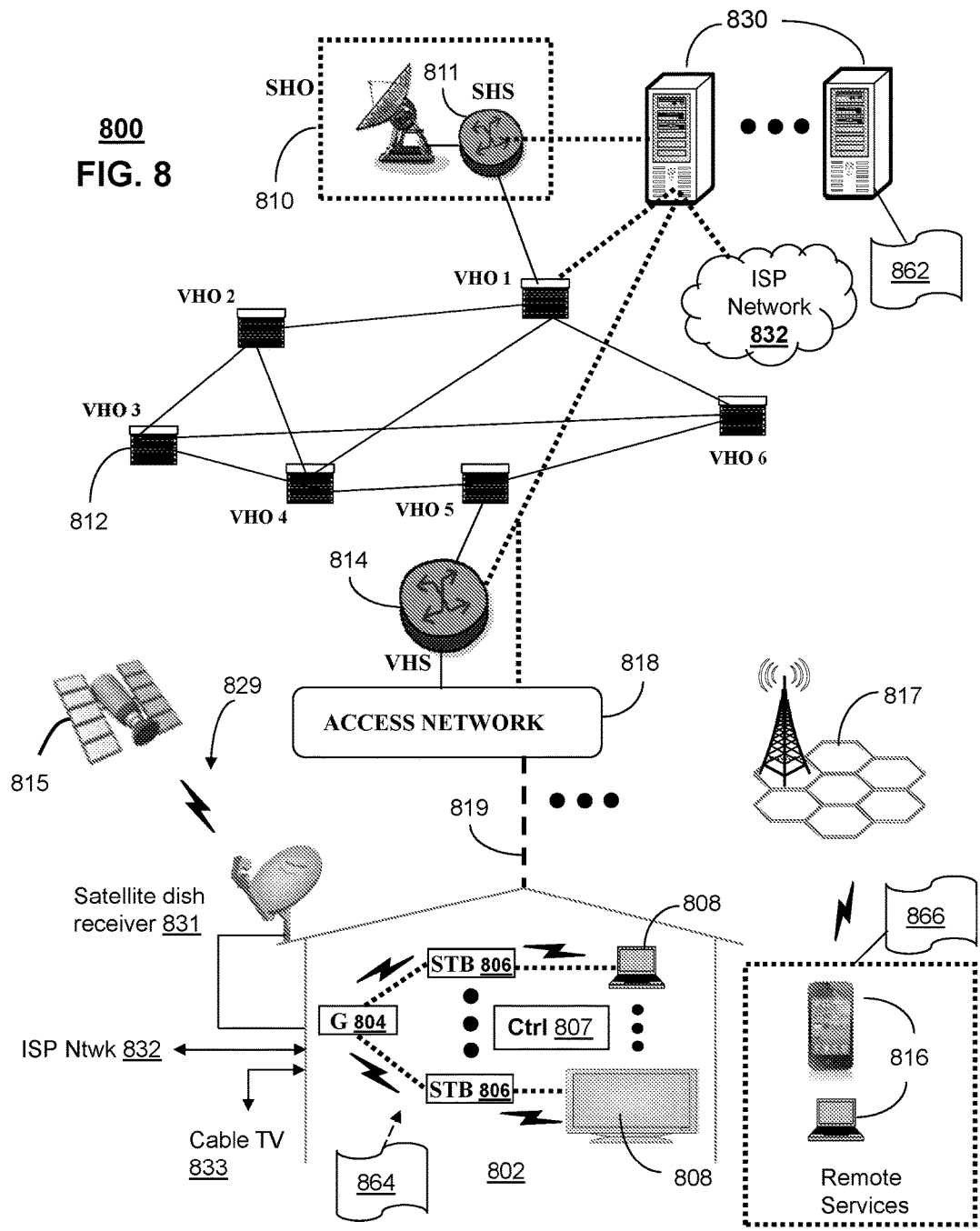
FIGS. 8-9 depict illustrative embodiments of communication systems that provide telecommunication and media services according to the system of FIGS. 1-6.

FIG. 8 depicts an illustrative embodiment of a first communication system 400 for delivering media content. The communication system 800 can represent an Internet Protocol Television (IPTV) media system. Communication system 800 can be overlaid or operably coupled with the system 100-600 of FIGS. 1-6 as another representative embodiment of communication system 800. For instance, one or more devices illustrated in the communication system 800 of FIG. 8 can provide inter-carrier VoLTE services via Tier 2 ENUM mapping.

The IPTV media system can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a Tier 2 ENUM server 830 (herein referred to as server 830). The server 830 can use computing and communication technology to perform function 862, which can include among other things, the telephone mapping techniques described by method 700 of FIG. 7. For instance, function 862 of server 830 can be similar to the functions described for servers 130 and 230 of FIGS. 1-4 in accordance with method 700 of FIG. 7. The media processors 806 and wireless communication devices 816 can be provisioned with software functions 864 and 866, respectively, to utilize the services of server 830. For instance, functions 864 and 866 of media processors 806 and wireless communication devices 816 can be similar to the functions described for the communication devices 122A and 122C of FIG. X in accordance with method 700 of FIG. 7.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 9:
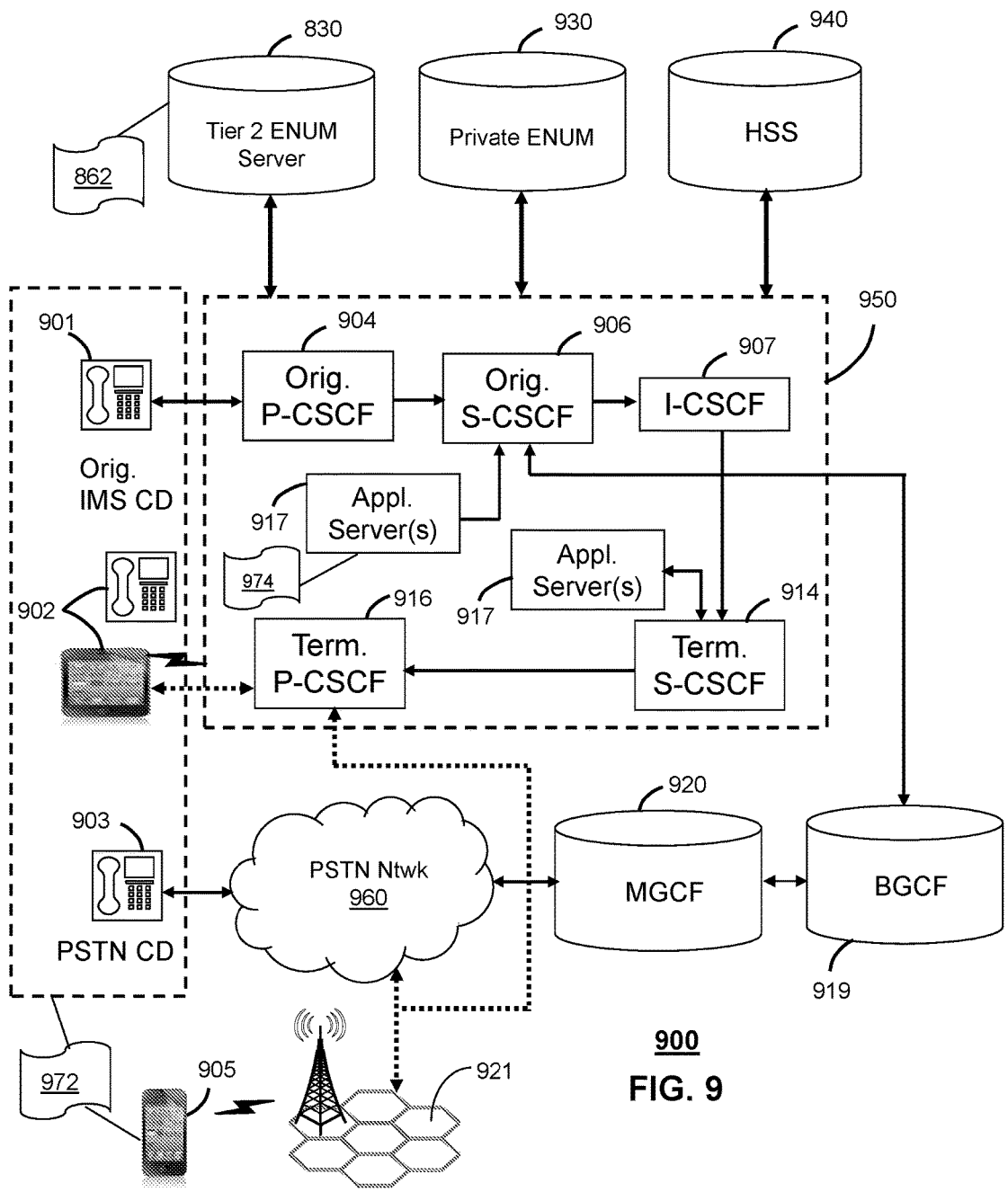

FIG. 9 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100-600 of FIGS. 1-6 and communication system 800 as another representative embodiment of communication system 900 for providing inter-carrier VoLTE services via Tier 2 ENUM mapping.

Communication system 900 can comprise a Home Subscriber Server (HSS) 940, a Private ENUM server 930, and other network elements of an IMS network 950. The IMS network 950 can establish communications between IMS-compliant communication devices (CDs) 901, 902, Public Switched Telephone Network (PSTN) CDs 903, 905, and combinations thereof by way of a Media Gateway Control Function (MGCF) 920 coupled to a PSTN network 960. The MGCF 920 need not be used when a communication session involves IMS CD to IMS CD communications. A communication session involving at least one PSTN CD may utilize the MGCF 920.

IMS CDs 901, 902 can register with the IMS network 950 by contacting a Proxy Call Session Control Function (P-CSCF) which communicates with an interrogating CSCF (I-CSCF), which in turn, communicates with a Serving CSCF (S-CSCF) to register the CDs with the HSS 940. To initiate a communication session between CDs, an originating IMS CD 901 can submit a Session Initiation Protocol (SIP INVITE) message to an originating P-CSCF 904 which communicates with a corresponding originating S-CSCF 906. The originating S-CSCF 906 can submit the SIP INVITE message to one or more application servers (ASs) 917 that can provide a variety of services to IMS subscribers.

For example, the application servers 917 can be used to perform originating call feature treatment functions on the calling party number received by the originating S-CSCF 906 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 906 can submit queries to the Private ENUM system 930 to translate an E.164 telephone number in the SIP INVITE message to a SIP Uniform Resource Identifier (URI) if the terminating communication device is IMS-compliant. The SIP URI can be used by an Interrogating CSCF (I-CSCF) 907 to submit a query to the HSS 940 to identify a terminating S-CSCF 914 associated with a terminating IMS CD such as reference 902. Once identified, the I-CSCF 907 can submit the SIP INVITE message to the terminating S-CSCF 914. The terminating S-CSCF 914 can then identify a terminating P-CSCF 916 associated with the terminating CD 902. The P-CSCF 916 may then signal the CD 902 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 9 may be interchangeable. It is further noted that communication system 900 can be adapted to support video conferencing. In addition, communication system 900 can be adapted to provide the IMS CDs 901, 902 with the multimedia and Internet services of communication system 800 of FIG. 8.

If the terminating communication device is instead a PSTN CD such as CD 903 or CD 905 (in instances where the cellular phone only supports circuit-switched voice communications), the Private ENUM system 930 can respond with an unsuccessful address resolution which can cause the originating S-CSCF 906 to forward the call to the MGCF 920 via a Breakout Gateway Control Function (BGCF) 919. The MGCF 920 can then initiate the call to the terminating PSTN CD over the PSTN network 960 to enable the calling and called parties to engage in voice and/or data communications.

It is further appreciated that the CDs of FIG. 9 can operate as wireline or wireless devices. For example, the CDs of FIG. 9 can be communicatively coupled to a cellular base station 921, a femtocell, a WiFi router, a Digital Enhanced Cordless Telecommunications (DECT) base unit, or another suitable wireless access unit to establish communications with the IMS network 950 of FIG. 9. The cellular access base station 921 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 9.

Cellular phones supporting LTE can support packet-switched voice and packet-switched data communications and thus may operate as IMS-compliant mobile devices. In this embodiment, the cellular base station 921 may communicate directly with the IMS network 950 as shown by the arrow connecting the cellular base station 921 and the P-CSCF 916.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The Tier 2 ENUM Server 830 of FIG. 8 can be operably coupled to communication system 500 for purposes similar to those described above. Tier 2 ENUM Server 830 can perform function 862 and thereby provide Tier 2 ENUM services for external carriers attempting to complete VoLTE calling sessions with the CDs 901, 902, 903 and 905 of FIG. 9 similar to the functions described for servers 130 and 230 of FIG. 1-6 in accordance with method 700 of FIG. 7. CDs 901, 902, 903 and 905, which can be adapted with software to perform function 97X to utilize the services of the Tier 2 ENUM Server 830 similar to the functions described for communication devices 122A and 122C of FIGS. 1-2 in accordance with method 700 of FIG. 7. Tier 2 ENUM Server 830 can be an integral part of the application server(s) 917 performing function 974, which can be substantially similar to function 864 and adapted to the operations of the IMS network 950.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 10:
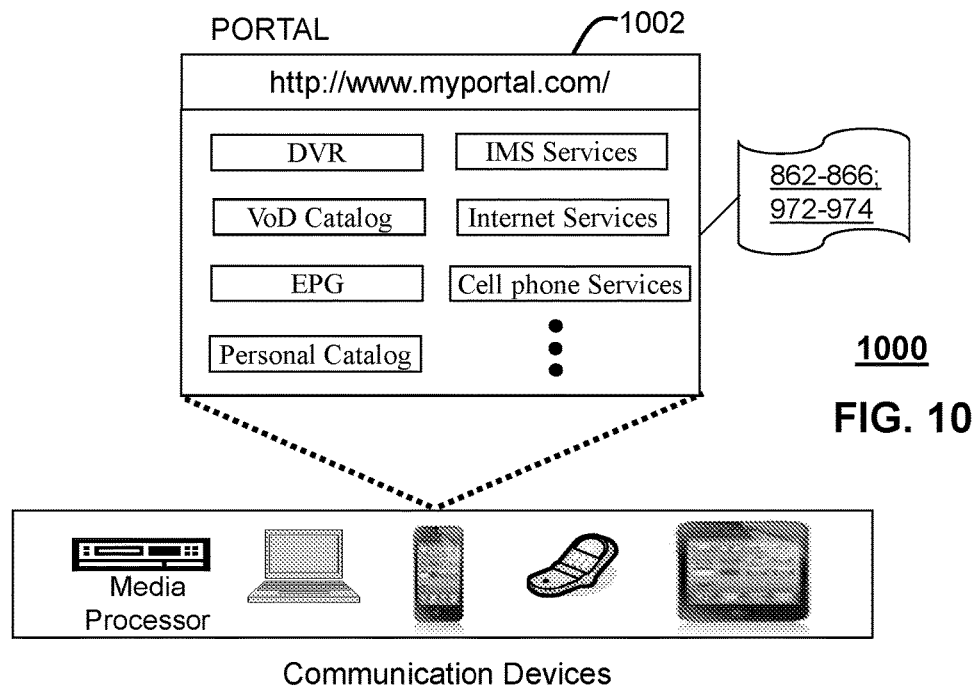
FIG. 10 depicts an illustrative embodiment of a web portal for interacting with the communication systems of FIGS. 1-6, and 8-9.

FIG. 10 depicts an illustrative embodiment of a web portal 1002 of a communication system 1000. Communication system 1000 can be overlaid or operably coupled with systems 100-600 of FIGS. 1-6, communication system 800, and/or communication system 900 as another representative embodiment of systems 100-600 of FIGS. 1-6, communication system 800, and/or communication system 900. The web portal 1002 can be used for managing services of systems 100-600 of FIGS. 1-6 and communication systems 800-900. A web page of the web portal 1002 can be accessed by a Uniform Resource Locator (URL) with an Internet browser using an Internet-capable communication device such as those described in FIGS. 1-6 and FIGS. 8-9. The web portal 1002 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 1002 can also be used for provisioning IMS services described earlier, provisioning Internet services, provisioning cellular phone services, and so on.

The web portal 1002 can further be utilized to manage and provision software applications 862-866, and 972-974 to adapt these applications as may be desired by subscribers and/or service providers of systems 100-600 of FIGS. 1-6, and communication systems 800-900. For instance, users of the services provided by server 130-230 or server 830 can log into their on-line accounts and provision the servers 130-230 or server 830 with user profiles, provide contact information to server to enable it to communication with devices described in FIGS. 1-6, and so on. Service providers can log onto an administrator account to provision, monitor and/or maintain the <systems 100-600 of FIGS. 1-6 or server 830.

Figure 11:
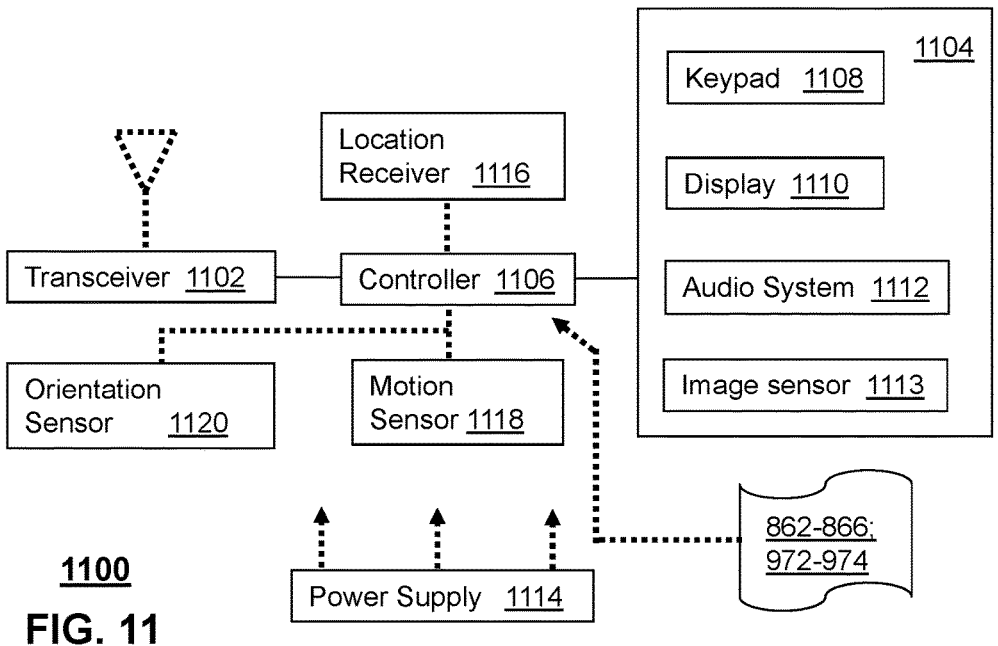
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 1-6, and FIGS. 8-9 and can be configured to perform portions of method 700 of FIG. 7.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of devices of FIGS. 1-6, the communication devices 122A and 122C of FIGS. 1-2, as well as the IMS CDs 901-902 and PSTN CDs 903-905 of FIG. 9. It will be appreciated that the communication device 1100 can also represent other devices that can operate in systems 100-600 of FIGS. 1-6, communication systems 800-900 of FIGS. 8-9, such as a gaming console and a media player. In addition, the controller 1106 can be adapted in various embodiments to perform the functions 862-864 and 972-974, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
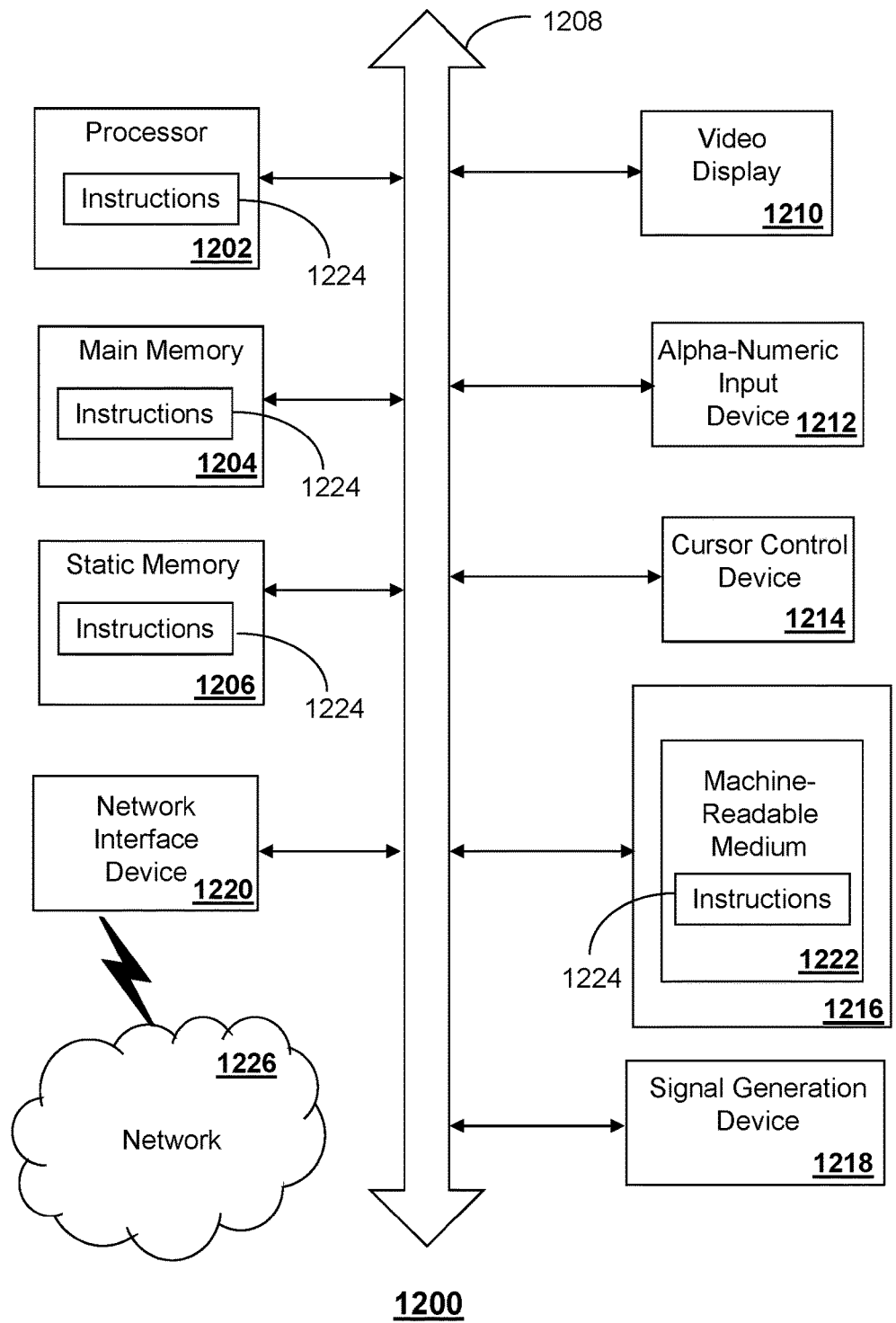
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the Tier 2 ENUM server 130-230, the communication devices 122A-C, and other devices of FIGS. 1-6. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 1200. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
receiving, from a private telephone number mapping server, a first database comprising a plurality of address records associated with a plurality of subscriber devices of a first carrier;
storing an inter-carrier mapping database based on the plurality of address records of the first database at an inter-carrier server system;
detecting an expiration of a timer to identify an update event for periodic updating of the first database;
requesting, responsive to the update event, a plurality of new address records associated with a plurality of new subscriber devices that have been registered with the first carrier since a prior update;
receiving the plurality of new address records that are requested;
updating the inter-carrier mapping database at the inter-carrier server system with the plurality of address records;
monitoring a plurality of queries for address records received from a plurality of carriers;
monitoring servicing, by a plurality of inter-carrier servers of the inter-carrier server system, of the plurality of queries for address records to determine a plurality of loadings for the plurality of inter-carrier servers;
comparing the plurality of loadings for the plurality of inter-carrier servers to a plurality of capabilities of the plurality of inter-carrier servers to determine load balance information for the plurality of inter-carrier servers;
receiving, from an internet protocol multimedia subsystem of a second carrier, a first query for an address record associated with a called number of a first device of the first carrier for initiating an internet protocol call between the first device and a second device of the second carrier;
determining, according to the load balance information for the plurality of inter-carrier servers, a first inter-carrier server of the plurality of inter-carrier servers of the inter-carrier server system for servicing the first query;
querying the inter-carrier mapping database of the inter-carrier server system for the address record associated with the called number; and
transmitting the address record of the called number to the internet protocol multimedia subsystem of the second carrier, responsive to the address record being found in the inter-carrier mapping database, for routing the internet protocol call between the second device of the second carrier and the first device of the first carrier.

2. The device of claim 1, wherein the operations further comprise converting the plurality of new address records from an intra-carrier format to an inter-carrier format.

3. The device of claim 2, wherein the operations further comprise:
determining, responsive to the first query, whether the address record for a called number is available in a temporary cache of recently retrieved address records.

4. The device of claim 3, wherein the operations further comprise retrieving the address record for the called number from the temporary cache if available.

5. The device of claim 1, wherein the internet protocol multimedia subsystem of a second carrier resolves a tier 2 address for the inter-carrier server system from a uniform resource locator according to a domain name server of an internetwork packet exchange network layer.

6. The device of claim 1, wherein the operations further comprise transmitting an indicator of no address record found to the internet protocol multimedia subsystem of the second carrier responsive to the address record not being found in the inter-carrier mapping database.

7. The device of claim 1, wherein the plurality of inter-carrier servers are distributed geographically.

8. The device of claim 1, wherein the operations further comprise:
resolving a first address of the first inter-carrier server; and
transmitting the first query to the first inter-carrier server according to the first address that is resolved.

9. A non-transitory machine-readable storage medium, comprising executable instructions that, when executed by a processing system including a processor, facilitate performance of operations, comprising:
receiving, from a private telephone number mapping server, a first database comprising a plurality of address records associated with a plurality of subscriber devices of a first carrier;
converting the plurality of address records of the first database from an intra-carrier format to an inter-carrier format to generate an inter-carrier mapping database;
storing the inter-carrier mapping database at an inter-carrier server system;
detecting an expiration of a timer to identify an update event for periodic updating of the first database;
requesting, responsive to the update event, a plurality of new address records associated with a plurality of new subscriber devices that have been registered with the first carrier since a prior update;
receiving the plurality of new address records that are requested;
updating the inter-carrier mapping database at the inter-carrier server system with the plurality of address records that have been converted to the inter-carrier format;
monitoring a plurality of queries for address records received from a plurality of carriers;
monitoring servicing, by a plurality of inter-carrier servers of the inter-carrier server system, of the plurality of queries for address records to determine a plurality of loadings for the plurality of inter-carrier servers;
comparing the plurality of loadings for the plurality of inter-carrier servers to a plurality of capabilities of the plurality of inter-carrier servers to determine load balance information for the plurality of inter-carrier servers;
receiving, from an internet protocol multimedia subsystem of a second carrier, a first query for an address record associated with a called number of a first device of the first carrier for initiating an internet protocol call between the first device and a second device of the second carrier, wherein the address record for the called number is not available at a telephone number mapping equipment of the second carrier;
determining, according to the load balance information for the plurality of inter-carrier servers, a first inter-carrier server of the plurality of inter-carrier servers of the inter-carrier server system for servicing the first query;
querying the inter-carrier mapping database of the inter-carrier server system for the address record associated with the called number; and
transmitting the address record to the internet protocol multimedia subsystem of the second carrier, responsive to the address record being found in the inter-carrier mapping database, for routing the internet protocol call between the second device of the second carrier and the first device of the first carrier.

10. The non-transitory machine-readable storage medium of claim 9, wherein the internet protocol multimedia subsystem of a second carrier resolves a tier 2 address for the inter-carrier server system from a uniform resource locator according to a domain name server of an internetwork packet exchange network layer.

11. The non-transitory machine-readable storage medium of claim 9, wherein the operations further comprise retrieving, responsive to the first query, the address record for the called number from a temporary cache of recently retrieved address records responsive to determining that the called number is available at the temporary cache.

12. The non-transitory machine-readable storage medium of claim 11, wherein the operations further comprise storing the address record in the temporary cache of recently retrieved address records.

13. The non-transitory machine-readable storage medium of claim 9, wherein the operations further comprise:
accessing, responsive to the first query, the load balance information associated with query traffic, wherein the plurality of inter-carrier servers each store a copy of the inter-carrier mapping database.

14. The non-transitory machine-readable storage medium of claim 13, wherein the plurality of inter-carrier servers are distributed geographically.

15. The non-transitory machine-readable storage medium of claim 13, wherein the operations further comprise:
resolving a first address of the first inter-carrier server; and
transmitting the first query to the first inter-carrier server according to the first address that is resolved.

16. The non-transitory machine-readable storage medium of claim 9, wherein the operations further comprise transmitting an indicator of no address record found to the internet protocol multimedia subsystem of the second carrier responsive to the address record not being found in the inter-carrier mapping database.

17. A method, comprising:
receiving, by a processing system including a processor, from a private telephone number mapping server, a first database comprising a plurality of address records associated with a plurality of subscriber devices of a first carrier;
storing, by the processing system and at an inter-carrier server system, an inter-carrier mapping database comprising the plurality of address records converted to an inter-carrier format;
detecting, by the processing system, an expiration of a timer to identify an update event for periodic updating of the first database;
receiving, by the processing system and responsive to the update event, a plurality of new address records associated with a plurality of new subscriber devices that have been registered with the first carrier since a prior update;
updating, by the processing system, the inter-carrier mapping database at the inter-carrier server system with the plurality of address records converted to the inter-carrier format;
monitoring, by the processing system, a plurality of queries for address records received from a plurality of carriers;
monitoring, by the processing system, servicing, by a plurality of inter-carrier servers of the inter-carrier server system, of the plurality of queries for address records to determine a plurality of loadings for the plurality of inter-carrier servers;
comparing, by the processing system, the plurality of loadings for the plurality of inter-carrier servers to a plurality of capabilities of the plurality of inter-carrier servers to determine load balance information for the plurality of inter-carrier servers;

receiving, by the processing system and from an internet protocol multimedia subsystem of a second carrier, a first query for an address record associated with a called number of a first device of the first carrier for initiating an internet protocol call between the first device and a second device of the second carrier;

determining, by the processing system, according to the load balance information for the plurality of inter-carrier servers, a first inter-carrier server of the plurality of inter-carrier servers of the inter-carrier server system for servicing the first query;

querying, by the processing system, the inter-carrier mapping database of the inter-carrier server system for the address record associated with the called number; and transmitting, by the processing system, the address record to the internet protocol multimedia subsystem of the second carrier for use by the internet protocol multimedia subsystem of a second carrier in routing the internet protocol call between the second device of the second carrier and the first device of the first carrier.

18. The method of claim 17, further comprising:

requesting, by the processing system and responsive to the detecting of the update event, the plurality of new address records associated with the plurality of new subscriber devices that have been registered with the first carrier since a prior update.

19. The method of claim 17, further comprising:

accessing, by the processing system and responsive to the first query, the load balance information associated with query traffic, wherein the plurality of inter-carrier servers each store a copy of the inter-carrier mapping database;

resolving, by the processing system, a first address of the first inter-carrier server; and transmitting, by the processing system, the first query to the first inter-carrier server according to the first address that is resolved.

20. The method of claim 17, further comprising:

retrieving, by the processing system and responsive to the first query, the address record for the called number from a temporary cache of recently retrieved address records responsive to determining that the called number is available at the temporary cache; and storing, by the processing system, the address record in the temporary cache of recently retrieved address records.

\* \* \* \* \*